(12) United States Patent
Board et al.

(10) Patent No.: US 10,800,441 B2
(45) Date of Patent: Oct. 13, 2020

(54) RETRACTABLE STEERING WHEEL

(71) Applicant: Ford Global Technologies, LLC, Dearborn, MI (US)

(72) Inventors: Derek Board, Ferndale, MI (US); Srinivasan Sundararajan, Ann Arbor, MI (US); Kevin Michael Pline, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 16/015,939

(22) Filed: Jun. 22, 2018

(65) Prior Publication Data

US 2019/0071113 A1    Mar. 7, 2019

Related U.S. Application Data

(60) Provisional application No. 62/553,734, filed on Sep. 1, 2017.

(51) Int. Cl.
| | |
|---|---|
| *B62D 1/14* | (2006.01) |
| *B62D 1/19* | (2006.01) |
| *B62D 1/181* | (2006.01) |
| *B62D 1/11* | (2006.01) |
| *B60R 21/20* | (2011.01) |
| *B62D 1/183* | (2006.01) |

(52) U.S. Cl.
CPC .............. *B62D 1/14* (2013.01); *B60R 21/20* (2013.01); *B62D 1/11* (2013.01); *B62D 1/181* (2013.01); *B62D 1/197* (2013.01); *B62D 1/183* (2013.01)

(58) Field of Classification Search
CPC .......... B60D 1/183; B60D 1/14; B60R 21/09; B60R 21/20; B60R 21/214; B62D 1/16; B62D 1/183; B62D 1/14; B62D 1/181; B62D 1/18; B62D 1/12; B62D 1/197; B62D 1/11
See application file for complete search history.

(56) References Cited

U.S. PATENT DOCUMENTS

| | | | |
|---|---|---|---|
| 1,416,636 A | 5/1922 | Hanes | |
| 1,459,957 A | 6/1923 | Merritt | |
| 2,155,123 A | 4/1939 | Gerardy | |
| 3,368,422 A | 2/1968 | Walter | |
| 4,503,504 A * | 3/1985 | Suzumura | ................ B60R 1/07 |
| | | | 280/775 |
| 5,368,331 A | 11/1994 | Morimoto | |
| 6,227,571 B1 * | 5/2001 | Sheng | .................... B62D 1/197 |
| | | | 280/731 |
| 8,024,090 B2 | 9/2011 | Imamura | |
| 2005/0121889 A1 | 6/2005 | Enders et al. | |
| 2009/0065285 A1 | 3/2009 | Maeda et al. | |
| 2010/0229674 A1 | 9/2010 | Tanaka | |

(Continued)

*Primary Examiner* — Paul N Dickson
*Assistant Examiner* — Kurtis Nielson
(74) *Attorney, Agent, or Firm* — Frank A. MacKenzie; Bejin Bieneman PLC

(57) ABSTRACT

An assembly includes a steering column. The assembly includes a pair of steering handles pivotally supported by the steering column and pivotable from an extended position toward the steering column to a retracted position. The assembly includes a processor and a memory storing instructions executable by the processor to pivot the steering handles to the retracted position upon detecting a triggering event.

17 Claims, 6 Drawing Sheets

(56) References Cited

U.S. PATENT DOCUMENTS

| | | | |
|---|---|---|---|
| 2014/0028008 A1* | 1/2014 | Stadler | B62D 1/192 |
| | | | 280/777 |
| 2014/0277896 A1 | 9/2014 | Lathrop et al. | |
| 2016/0083002 A1* | 3/2016 | Lin | B62D 1/06 |
| | | | 74/554 |
| 2017/0297606 A1* | 10/2017 | Kim | B62D 1/181 |
| 2018/0244175 A1* | 8/2018 | Tan | B60N 2/0248 |
| 2019/0381962 A1* | 12/2019 | Sheldon | B60R 21/207 |

* cited by examiner

RETRACTABLE STEERING WHEEL

CROSS-REFERENCE TO RELATED APPLICATIONS

The subject patent application claims priority to and all the benefits of U.S. Provisional Patent Application No. 62/553,734 filed on Sep. 1, 2017, which is herein incorporated by reference in its entirety.

BACKGROUND

A vehicle may include a steering wheel permitting an operator of the vehicle to provide input to the vehicle and control a steering angle of wheels of the vehicle. The steering wheel may occupy space within a passenger cabin of the vehicle.

DETAILED DESCRIPTION

Figure 1:
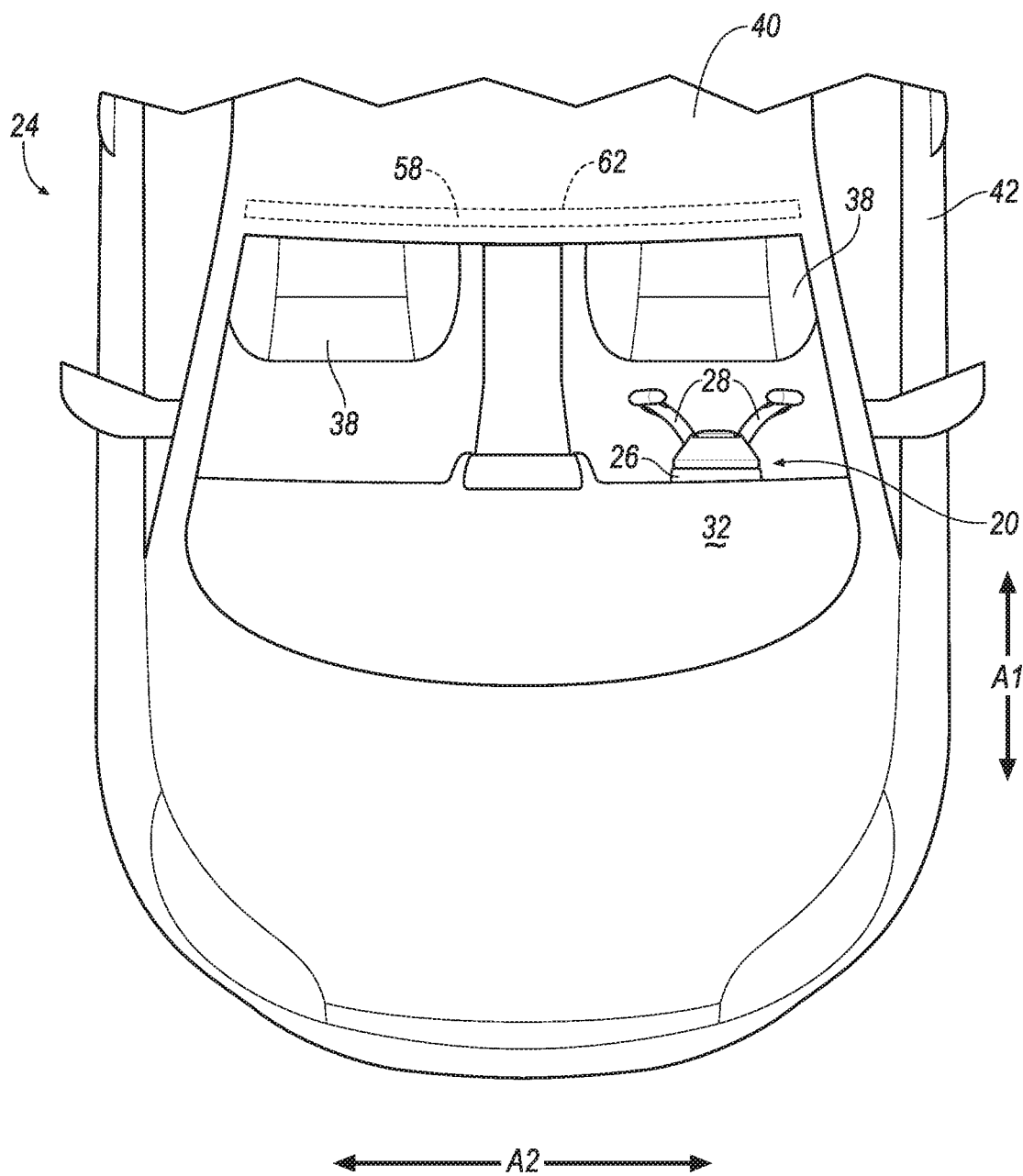
FIG. 1 is a perspective view of vehicle with an airbag in an uninflated position and steering handles in extended positions.

An assembly includes a steering column. The assembly includes a pair of steering handles pivotally supported by the steering column and pivotable from an extended position toward the steering column to a retracted position. The assembly includes a processor and a memory storing instructions executable by the processor to pivot the steering handles to the retracted position upon detecting a triggering event.

The triggering event may be a vehicle impact.

The memory may store instructions executable by the processor to pivot the steering handles to the extended position or the retracted position based on a determination of whether a vehicle door is in a closed position or an open position.

The memory may store instructions executable by the processor to pivot the steering handles to the retracted position upon determining a vehicle engine is in an off-state.

The memory may store instructions executable by the processor to pivot the steering handles to the extended position upon determining a vehicle engine is in an on-state.

The memory may store instructions executable by the processor to pivot the steering handles to the retracted position or the extended position based on a determination of whether a vehicle is in an autonomous mode or a manual mode.

The memory may store instructions executable by the processor to inflate an airbag after pivoting the steering handles to the retracted position.

The memory may store instructions executable by the processor to pivot the steering handles to the extended position upon determining a vehicle seat is occupied.

The steering handles may each include a slot, and the assembly may further include a ring supported by the steering column and operatively engaged with the slots of the steering handles.

The steering column may define an axis, the ring may be movable along the axis, and movement of the ring along the axis may cause the steering handles to pivot.

The assembly may include a pair of support arms pivotally supporting the steering handles, the ring located between the steering column and the support arms.

The steering column may include a shaft, the ring and the support arms may be supported by the shaft.

The assembly may include an actuator configured to move the ring along the axis.

The assembly may include an actuator configured to pivot the steering handles to the retracted position.

The assembly may include a second actuator configured to pivot the steering handles to the retracted position and to the extended position.

An assembly includes a processor and a memory storing instructions executable by the processor to actuate an actuator configured to pivot a pair steering handles from an extended position toward a steering column to a retracted position upon detecting a triggering event.

The triggering event may be a vehicle impact.

The memory may store instructions executable by the processor to actuate a second actuator configured to pivot the steering handles to the extended position or the retracted position based on a determination of whether a vehicle door is an open position or a closed position.

The memory may store instructions executable by the processor to actuate a second actuator configured to pivot the steering handles to the extended position or the retracted position based on a determination of whether a vehicle seat is occupied or unoccupied.

The memory may store instructions executable by the processor to inflate an airbag after pivoting the steering handles to the retracted position.

With reference to FIGS. 1-5, wherein like numerals indicate like parts throughout the several views, an assembly 20 for controlling a steering system 22 of a vehicle 24 includes a steering column 26 and a pair of steering handles 28 pivotally supported by the steering column 26. The steering handles 28 are pivotable from an extended position toward the steering column 26 to a retracted position. The assembly 20 includes a computer 30 having a processor and a memory. The memory stores instructions executable by the processor to pivot the steering handles 28 to the retracted position upon detecting a triggering event. Moving the steering handles 28 in response to the triggering event causes the steering handles 28 to be in the retracted position at advantageous times, e.g., when an occupant may be entering or exiting the vehicle 24, when input from the occupant to the steering handles 28 is not required, when a vehicle impact is detected, etc.

The vehicle 24 may be any passenger or commercial automobile such as a car, a truck, a sport utility vehicle, a crossover vehicle, a van, a minivan, a taxi, a bus, etc. The vehicle 24 may define a longitudinal axis A1, e.g., extending between a front and rear of the vehicle 24. The vehicle 24 may define a cross-vehicle axis A2, e.g., extending between a right side and a left side of the vehicle 24. The front, rear, right side, and left side may be relative to an orientation of the occupant of the vehicle 24. The front, rear, right side, and left side rear may be relative to an orientation of controls for operating the vehicle 24, e.g., the steering handles 28, an instrument panel 32 of the vehicle 24, etc. The front, rear, right side, and left side may be relative to a driving direction of the vehicle 24 when wheels of the vehicle 24 are all parallel with each other, etc.

The vehicle 24 may operate in an autonomous mode, a semi-autonomous mode, or a manual mode. For purposes of this disclosure, an autonomous mode is defined as one in which each of a propulsion system 34, a braking system 36, and the steering system 22 of the vehicle 24 are controlled by the computer 30; in a semi-autonomous mode the computer 30 controls one or two of the propulsion system 34, the braking system 36, and the steering system 22; in the manual mode, the occupant controls the propulsion system 34, the braking system 36, and the steering system 22.

The vehicle 24 includes a passenger cabin to house occupants, if any, of the vehicle 24. The passenger cabin includes one or more seats 38, shown in FIG. 1. The seats 38 may be bucket seats, bench seats, or any other suitable type. The position and orientation of the seats 38 and components thereof may be adjustable by the occupant.

The instrument panel 32 may be disposed at a forward end of the passenger cabin and face toward the seats 38. The instrument panel 32 may include vehicle controls, including the steering handles 28.

Figure 2:
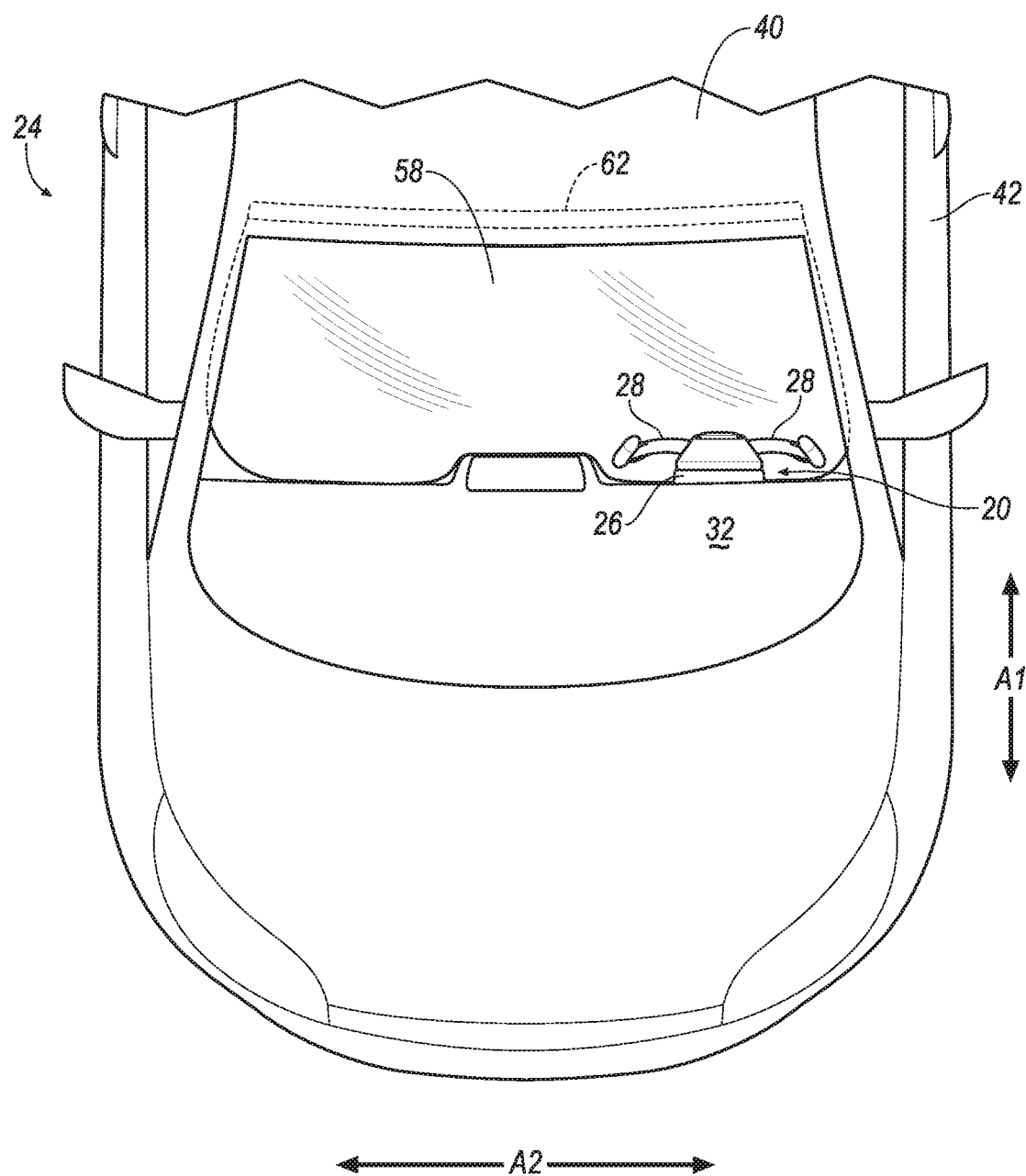
FIG. 2 is a perspective view of the vehicle with the airbag in an inflated position and the steering handles in retracted positions.

The vehicle 24 may include a roof 40, shown in FIGS. 1 and 2. The roof 40 provides cover and protection to occupants of the vehicle 24. The roof 40 may include rails that extend along the longitudinal axis A1. The roof 40 may include beams that extend along the cross-vehicle axis A2, e.g., between the rails. The roof 40 may include an exterior panel and a headliner. The rails and beams provide support to the exterior panel and the headliner. The rails and beams may be steel, aluminum, carbon fiber, or any other suitable material. The headliner and the exterior panel provide class-A surfaces to the roof 40, i.e., surfaces specifically manufactured to have a high-quality, finished aesthetic appearance free of blemishes, etc.

The vehicle 24 may include one or more doors 42, shown in FIGS. 1 and 2. The doors 42 may be supported by a body and/or frame of the vehicle 24. The doors 42 may each be movable from a closed position to an open position (not shown), and vice versa. In the open position the doors 42 permit the occupant to enter and exit the passenger cabin. In the closed position the doors 42 restrict the occupant from entering and exiting the passenger cabin.

Figure 5:
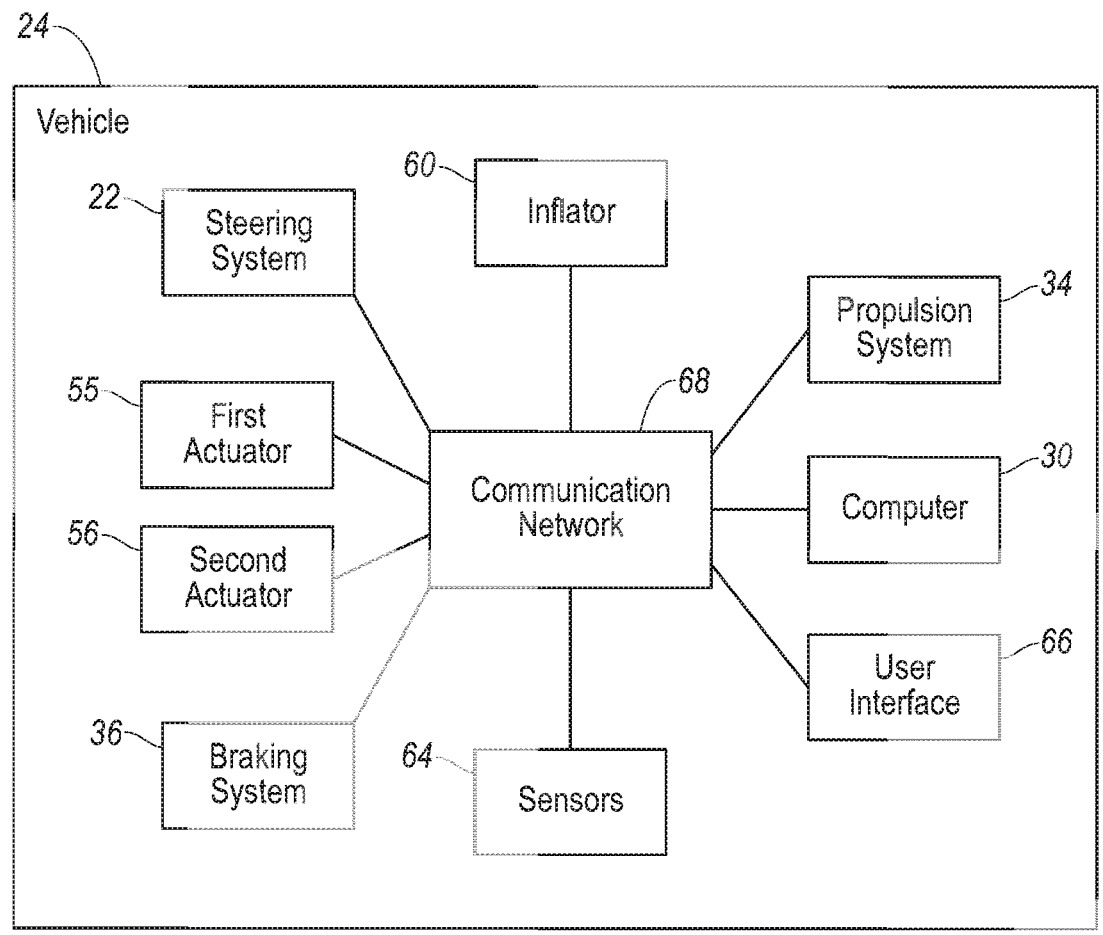
FIG. 5 is a block diagram of components of the vehicle.

The propulsion system 34 of the vehicle 24, shown in FIG. 5, translates energy into motion of the vehicle 24. The propulsion system 34 may include one or more vehicle propulsion subsystems, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type. The internal-combustion engine may operate in an on-state, i.e., in which a crankshaft of the engine is rotating. The internal-combustion engine may operate in an off-state, i.e., in which the crankshaft of the engine is not rotating. The propulsion system 34 is in communication with and receives input from the computer 30 and from the occupant of the vehicle 24. The occupant may control the propulsion system 34 via, e.g., an accelerator pedal and/or a gear-shift lever.

The braking system 36, shown in FIG. 5, resists the motion of the vehicle 24 to thereby slow and/or stop the vehicle 24. The braking system 36 may include friction brakes such as disc brakes, drum brakes, band brakes, and so on; regenerative brakes; any other suitable type of brakes; or a combination. The braking system 36 is in communication with and receives input from the computer 30 and the occupant of the vehicle 24. The occupant may control the braking system 36 via, e.g., a brake pedal.

The steering system 22, shown in FIG. 5, controls the turning of the wheels. The steering system 22 may include a rack-and-pinion system with electric power-assisted steering, a steer-by-wire system, or any other suitable system. The steering system 22 is in communication with and receives input from the computer 30 and the occupant of the vehicle 24. The occupant may control the steering system 22 via, e.g., the steering handles 28.

The steering column 26, shown in FIGS. 1-4, transfers rotation of the steering handles 28 to movement of the steering system 22. The steering column 26 may include a shaft 44, shown in FIGS. 3 and 4. Rotation of the shaft 44 causes the steering system 22 to turn the wheels. For example, the shaft 44 may be operatively coupled to a rack-and-pinion system. As another example, a sensor 64 may detect a rotational position of the shaft 44 for use in a steer-by-wire system. The steering column 26 defines an axis A3. The shaft 44 may be elongated along the axis A3 of the steering column 26.

The pair of steering handles 28 enables the occupant to control the steering system 22, e.g., via rotation of the shaft 44 of the steering column 26. The steering handles 28 are pivotally supported by the steering column 26. The steering handles 28 are pivotable from the extended position, shown in FIGS. 1 and 3, toward the steering column 26 to the retracted position, shown in FIGS. 2 and 4, and vice versa. For example, the steering handles 28 may be closer to the instrument panel 32 in the retracted position than in the extended position, and pivot therebetween.

Figure 3:
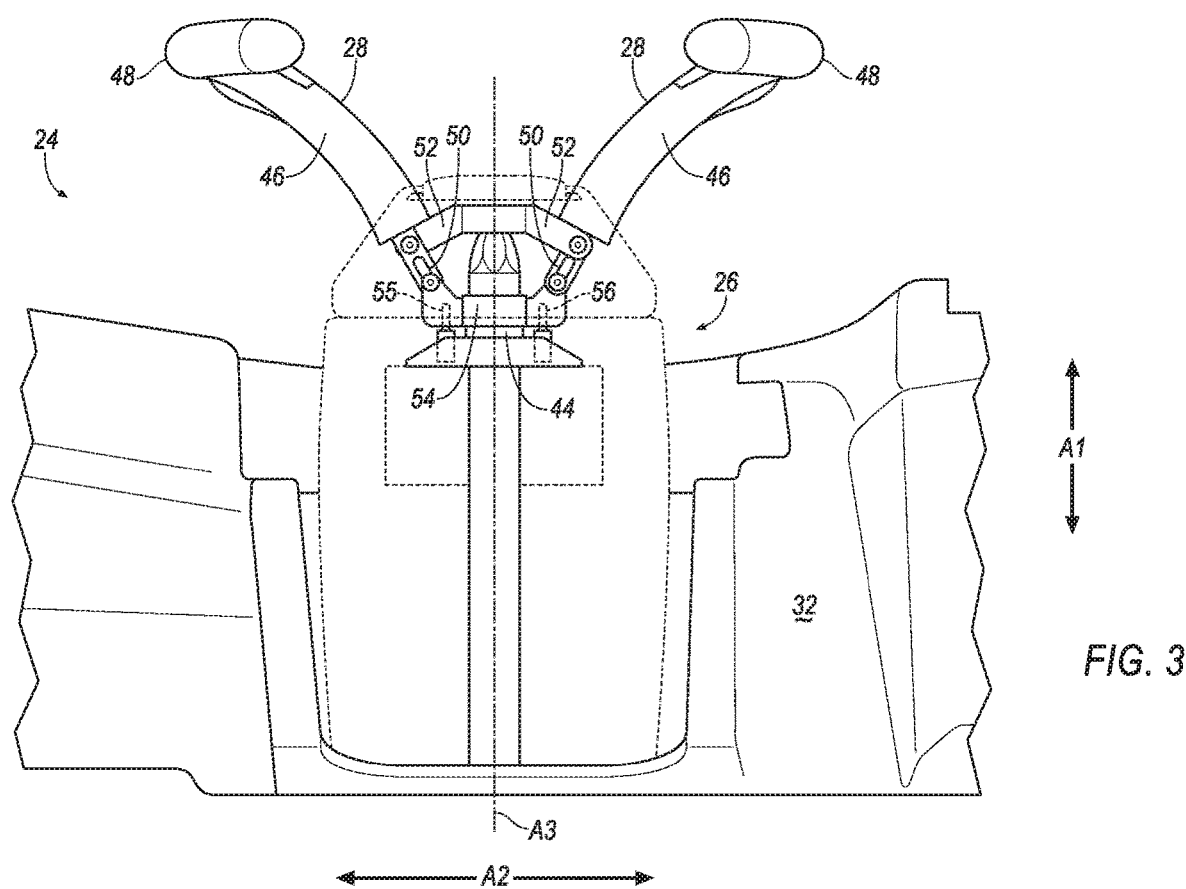
FIG. 3 is a top view of the view of the vehicle with the steering handles in the extended positions.
Figure 4:
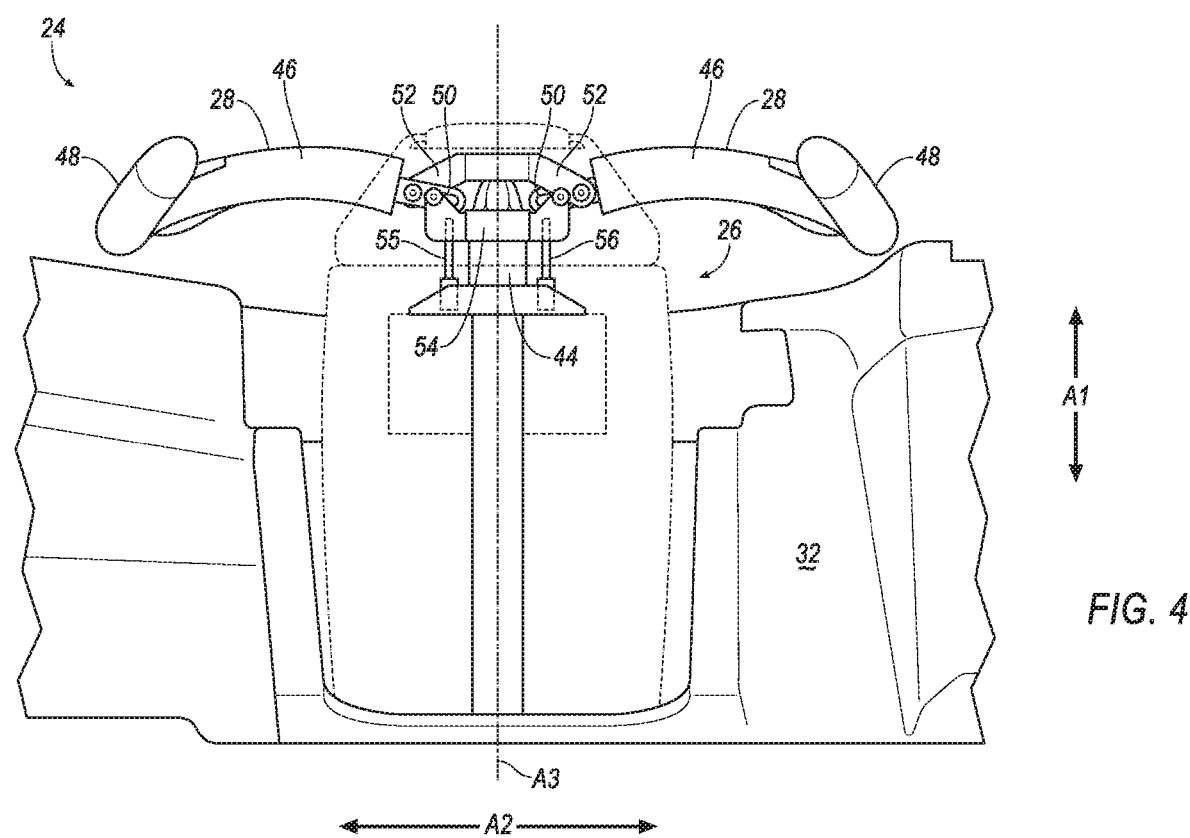
FIG. 4 is a top view of the view of the vehicle with the steering handles in the retracted positions.

With reference to FIGS. 3 and 4, each steering handle 28 may include an arm 46 extending away from the steering column 26, e.g., from the shaft 44, to a distal end. Each steering handle 28 may include a grip 48 for the occupant to grasp. The grips 48 may be supported by the arms 46, e.g., fixed to the distal ends. The steering handles 28 may each include a slot 50. For example, the slots 50 may be in the arms 46.

The assembly 20 may include a pair of support arms 52. The support arms 52 may be supported by the shaft 44. The support arms 52 may extend from the shaft 44 to distal ends. The support arms 52 may extend radially from the shaft 44 relative to the axis A3. The support arms 52 may extend from the shaft 44 opposite each other. The support arms 52 may be fixed to the shaft 44, e.g., via fastener, welding, friction fit, etc. The support arms 52 and the shaft 44 may be monolithic, i.e., a single, uniform piece of material with no seams, joints, fasteners, or adhesives holding the support arms 52 and the shaft 44 together. Movement of the support arms 52 about the axis A3 may rotate the shaft 44, and vice versa. The support arms 52 may be metal, plastic, or any other suitable material.

The support arms 52 may pivotally support the steering handles 28. For example, the support arms 52 may be operatively coupled to arms 46 of the steering handles 28 such that the steering handles 28 may pivot relative to the support arms 52. For example, the support arms 52 may each include a post at the distal ends and the posts may be received by holes in the arms 46 of the steering handles 28, or vice versa. As another example, hinge pins may rotatably couple the support arms 52 to the steering handles 28.

The assembly 20 may include a ring 54. The ring 54 may be supported by the steering column 26, e.g., by the shaft 44.

The ring 54 may be movable along the axis A3 of the steering column 26. For example, the ring 54 may slide along the shaft 44. The ring 54 may be located between the steering column 26 and the support arms 52. Movement of the ring 54 along the axis A3 causes the steering handles 28 to pivot. For example, when the ring 54 is moved to an extended position away from the steering column 26, e.g., toward the seat 38, the steering handles 28 may pivot to the retracted position. When the ring 54 is moved to a retracted position toward the steering column 26, e.g., away from the seat 38, the steering handles 28 may pivot to the extended position. The ring 54 may be operatively engaged with the slots 50 of the steering handles 28. For example, as shown in FIGS. 3 and 4, the ring 54 may include a pair of posts, each post received in one of the slots 50 of the steering handles 28. The posts may be slidable within the slots 50, e.g., as the ring 54 moves along the shaft 44.

The assembly 20 may include a first actuator 55. The first actuator 55 may be configured to pivot the steering handles 28 to the retracted position, e.g., in response to an instruction from the computer 30. The first actuator 55 may be a pyrotechnic-type actuator, or any other suitable type of actuator. For example, the first actuator 55 may include a piston and a cylinder. Pyrotechnic material may be in the cylinder adjacent the piston. Actuation of the pyrotechnic material, e.g., in response to an instruction from the computer 30, may generate gas and urge the piston within the cylinder to move the first actuator 55 from a retracted position to an extended position. The pyrotechnic-type actuator enables the steering handles 28 to be quickly pivoted to the retraced position, e.g., after a vehicle impact is detected and before an airbag 58 is deployed.

The first actuator 55 in the extended position is longer than in the retracted position. The first actuator 55 in the extended position may position the steering handles 28 in the retracted position. The first actuator 55 may be configured to move the ring 54 along the axis A3. One end of the first actuator 55 may be connected to the ring 54 and an opposite end of the first actuator 55 may be connected to the steering column 26, the instrument panel 32, etc. Movement of the first actuator 55 from the retracted position to the extended position may urge the ring 54 away from the steering column 26 and toward the seat 38, moving the steering handles 28 to the retracted position.

The assembly 20 may include a second actuator 56. The adjectives "first" and "second" are used throughout this document as identifiers and are not intended to signify importance or order. The second actuator 56 may be configured to pivot the steering handles 28 to the retracted position and to the extended position, e.g., in response to an instruction from the computer 30. The second actuator 56 may be, e.g., mechanical, hydraulic, pneumatic, or any other suitable type of actuator. For example, the second actuator 56 may include a rack and pinion, a piston and cylinder, a roller screw, etc. The second actuator 56 may move from a retracted position to an extended position, and vice-versa. The second actuator 56 in the extended position is longer than in the retracted position. The second actuator 56 in the extended position may position the steering handles 28 in the retracted position. The second actuator 56 in the retracted position may position the steering handles 28 in the extended position. The second actuator 56 may be configured to move the ring 54 along the axis A3. One end of the second actuator 56 may be connected to the ring 54 and an opposite end of the second actuator 56 may be connected to the steering column 26, the instrument panel 32, etc. Movement of the second actuator 56 from the retracted position to the extended position may urge the ring 54 away from the steering column 26 and toward the seat 38, moving the steering handles 28 to the retracted position. Movement of the second actuator 56 from the extended position to the retracted position may urge the ring 54 toward the steering column 26 and away from the seat 38, moving the steering handles 28 to the extended position.

The vehicle 24 may include the airbag 58. The airbag 58 is deployable from an uninflated position, shown in FIG. 1, to an inflated position, shown in FIG. 2, e.g., during a vehicle impact to control kinematics of occupants inside the vehicle 24 during the impact. The airbag 58 in the inflated position may extend along the cross-vehicle axis A2. The airbag 58 in the inflated position may be between the seat 38 and the steering column 26, e.g., along the longitudinal axis A1.

The airbag 58 may be formed of a woven polymer or any other material. As one example, the airbag 58 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

An inflator 60 may be connected to the airbag 58. Upon receiving a signal from, e.g., the computer 30, the inflator 60 may inflate the airbag 58 with an inflatable medium, such as a gas. The inflator 60 may be, for example, a pyrotechnic inflator that uses a chemical reaction to drive inflation medium to the airbag 58. The inflator 60 may be of any suitable type, for example, a cold-gas inflator.

The vehicle 24 may include an airbag housing 62. The inflator 60 and the airbag 58 in the uninflated position may be disposed in the airbag housing 62. The airbag housing 62 provides a reaction surface for the airbag 58 in the inflated position. The airbag housing 62 may be supported by the roof 40, or any at any other suitable location of the vehicle 24. The airbag housing 62 may be formed of any suitable material, e.g., a rigid polymer, a metal, a composite, etc.

The vehicle 24 may include sensors 64, shown in FIG. 5. The sensors 64 may be located at numerous points in or on the vehicle 24.

The sensors 64 may detect internal states of the vehicle 24, for example, wheel speed, wheel orientation, engine and transmission variables, a rotational position of the shaft 44 relative to the instrument panel 32, etc., e.g., with proximity sensors, hall effect sensors, etc.

The sensors 64 may detect the position or orientation of the vehicle 24. For example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers.

The sensors 64 may detect the external world. For example, light measurement sensors, photometers, microphones, wind speed measurement sensors, radar sensors, scanning laser range finders, light detection and ranging (LIDAR) devices, and image processing sensors such as cameras.

The sensors 64 may detect whether one or more of the doors 42 are in the open position of the closed position, e.g., with proximity sensors, contact sensors, switches, etc.

The sensors 64 may detect an impact to the vehicle 24, for example, post-contact sensors such as accelerometers, pressure sensors, and contact switches, etc.; and pre-impact sensors such as radar, LIDAR, and vision-sensing systems, etc. The vision systems may include one or more cameras, CCD image sensors, CMOS image sensors, etc.

The sensors 64 may detect occupancy of one or more of the seats 38. For example, the sensors 64 may be visible-light or infrared cameras directed at one or more of the seats 38, weight sensors in the seats 38, sensors detecting whether a seatbelt for one of the seats 38 is buckled or unspooled, etc.

The vehicle 24 may include a user interface 66, shown in FIG. 5. The user interface 66 presents information to and receives information from the occupant of the vehicle 24. The user interface 66 may be located, e.g., on the instrument panel 32 in the passenger cabin of the vehicle 24, or wherever may be readily seen by the occupant. The user interface 66 may include dials, digital readouts, screens such as a touch-sensitive display screen, speakers, and so on for providing information to the occupant, e.g., human-machine interface (HMI) elements. The user interface 66 may include buttons, knobs, keypads, microphone, and so on for receiving information from the occupant.

The vehicle 24 may include a communication network 68, shown in FIG. 5. The communication network 68 includes hardware, such as a communication bus, for facilitating communication among vehicle components, e.g., the computer 30, the first actuator 55, the second actuator 56, the steering system 22, the propulsion system 34, the braking system 36, the inflator 60, the sensors 64, the user interface 66, etc. The communication network 68 may facilitate wired or wireless communication among the vehicle 24 components in accordance with a number of communication protocols such as controller area network (CAN), Ethernet, WiFi, Local Interconnect Network (LIN), and/or other wired or wireless mechanisms.

The computer 30 may be a microprocessor-based computer implemented via circuits, chips, or other electronic components. For example, the computer 30 may include a processor, memory, etc. The memory of the computer 30 may store instructions executable by the processor as well as electronically stored data and/or databases.

The computer 30 may be programmed to operate the vehicle 24 in the autonomous mode. In the autonomous mode the computer 30 navigates the vehicle 24 by transmitting commands to the steering system 22, the propulsion system 34, and the braking system 36 without operator input, e.g., via the steering handles 28, the brake pedal, the accelerator pedal, etc. The computer 30 may operate the vehicle 24 in the autonomous mode based information from the sensors 64, e.g., received via the communication network 68.

The computer 30 may be programmed to permit operator control of the vehicle 24 in the manual mode. In the manual mode the operator controls the steering system 22, the propulsion system 34, and the braking system 36, e.g., by providing input to the steering handles 28, the brake pedal, the accelerator pedal, etc. In the manual mode the computer 30 may operate as a relay to transmit input provided from the operator as commands to the steering system 22, the propulsion system 34, and the braking system 36 based on the inputs. In the manual mode the computer 30 may provide supplemental control to the steering system 22, the propulsion system 34, and the braking system 36 in addition to the input provided by the occupant, e.g., to control transmission shift points, actuate anti-lock braking, etc.

The computer 30 may be programmed to select the autonomous or the manual mode based on information from the user interface 66. For example, the occupant may provide input to the user interface 66 indicating the manual mode or the autonomous mode. The user inference may transmit information to the computer 30, e.g., via the communication network 68, indicating such selection.

The computer 30 may be programmed to detect a triggering event. The triggering event is detectable by the computer 30 and indicates to the computer 30 that the steering handles 28 should pivot to the retracted position or the extended position. For example, the triggering event may be a vehicle impact, e.g., detected by the computer 30 based on information received from the sensors 64, e.g., information from impact sensors received via the communication network 68. As another example, the triggering event may be a detection of whether the door 42 is in the open position or the closed position, e.g., determined by the computer 30 based on information from the sensors 64, e.g., proximity sensors, contact sensors, etc., configured to detect the position of the door 42 and in communication with the computer 30 via the communication network 68. As yet another example, the triggering event may be a detection of whether the seat 38 of the vehicle 24 is occupied, e.g., as determined by the computer 30 based on information from the sensors 64, e.g., determined by the computer 30 based on information from occupancy sensors and in communication with the computer 30 via the communication network 68. As an additional example, the triggering event may be a detection of whether the engine of the vehicle 24 is in the on-state or the off-state, e.g., determined by the computer 30 based on information from the sensors 64. As yet one more example, the triggering event may be a detection of the manual mode or the autonomous mode, e.g., identified by the computer 30 based on information received from the user interface 66 via the communication network 68 when the occupant provides input to the user interface 66 selecting the autonomous mode or the manual mode.

The computer 30 may be programmed to pivot the steering handles 28 to the retracted position. For example, the computer 30 may send an instruction, e.g., via the communication network 68, to the first actuator 55 instructing the first actuator 55 to actuate to the extended position. As another example, the computer 30 may send an instruction, e.g., via the communication network 68, to the second actuator 56 instructing the second actuator 56 to actuate to the extended position.

The computer 30 may be programmed to pivot the steering handles 28 to the extended position. For example, the computer 30 may send an instruction, e.g., via the communication network 68, to the second actuator 56 instructing the second actuator 56 to actuate to the retracted position.

The computer 30 may be programmed to pivot the steering handles 28 to the retracted position or the extended position upon detecting the triggering event. For example, the computer 30 may instruct the first actuator 55 to the extended position in response to detecting a vehicle impact, causing the steering handles 28 to pivot to the retracted position. As other examples, the computer 30 may instruct the second actuator 56 to the extended position in response to determining the door 42 is in the open position, determining the seat 38 is not occupied, determining the autonomous mode has been selected, determining the engine is in the off-state, etc., causing the steering handles 28 to pivot to the retracted position. As yet more examples, the computer 30 may instruct the second actuator 56 to the retracted position in response to determining the door 42 is in the closed position, determining the seat 38 is occupied, determining the manual mode has be selected, determining the engine is in the on-state, etc., causing the steering handles 28 to pivot to the extended position.

The computer 30 may be programmed to inflate the airbag 58. For example, the computer 30 may transmit a signal through the communication network 68 to the inflator 60 instructing actuation of the inflator 60. The inflator 60 may discharge and inflate the airbag 58. The computer 30 may inflate the airbag 58 in response to detecting a vehicle impact, e.g., based on information from the sensors 64, e.g., from impact sensors and received via the communication network 68. The computer 30 may inflate the airbag 58 after pivoting the steering handles 28 to the retracted position.

Figure 6:
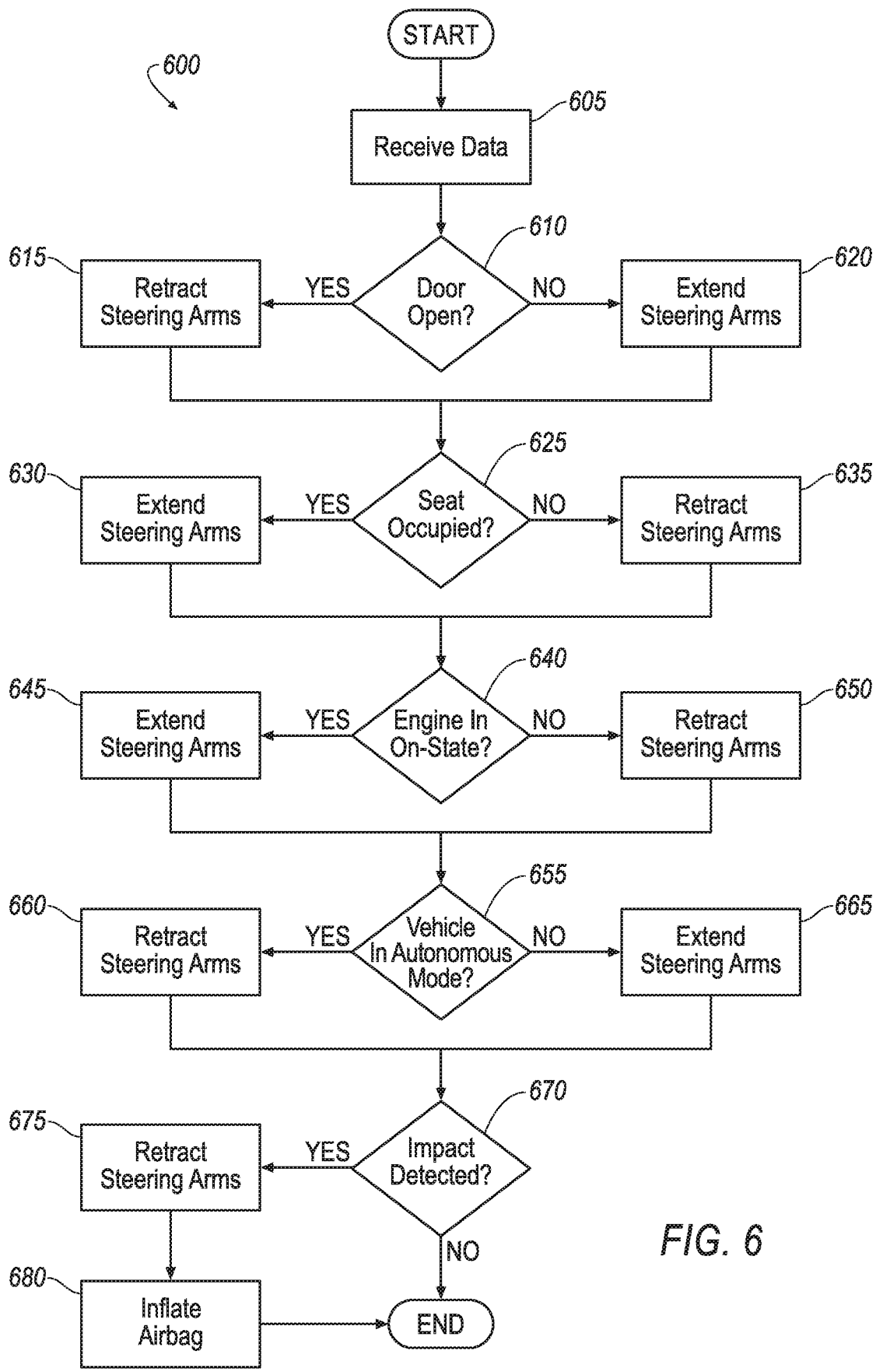
FIG. 6 is a flow chart showing a process for controlling the steering handles and the airbag.

FIG. 6 is a process flow diagram illustrating an exemplary process 600 for controlling the steering handles 28 and the airbag 58. The process 600 begins in a block 605 in which the computer 30 receives data, e.g., from the sensors 64, the user interface 66, etc., e.g., via the communication network 68. The computer 30 may continue to receive data throughout the process 600. Throughout the process 600 in the present context means substantially continuously or at time intervals, e.g., every 200 milliseconds.

Next, as a block 610 the computer 30 determines whether the door 42 is in the open position, e.g., based on information from the sensors 64 received via the communication network 68. Upon determining that the door 42 is in the open position the process 600 moves to a block 615. Upon determining that the door 42 is not in the open position, e.g., determining that the door 42 is in the closed position, the process 600 moves to a block 620.

At the block 615 the computer 30 pivots the steering handles 28 to the retracted position. For example, the computer 30 may instruct the second actuator 56 to the extended position.

At the block 620 the computer 30 pivots the steering handles 28 to the extended position. For example, the computer 30 may instruct the second actuator 56 to the retracted position.

At a block 625 the computer 30 determines whether the seat 38 is occupied, e.g., based on information from the sensors 64 received via the communication network 68. Upon determining that the seat 38 is occupied the process 600 moves to a block 630. Upon determining that the seat 38 is not occupied the process 600 moves to a block 635.

At the block 630 the computer 30 pivots the steering handles 28 to the extended position. For example, the computer 30 may instruct the second actuator 56 to the retracted position.

At the block 635 the computer 30 pivots the steering handles 28 to the retracted position. For example, the computer 30 may instruct the second actuator 56 to the extended position.

At a block 640 the computer 30 determines whether the engine of the vehicle 24 is in the on-state, e.g., based on information from the sensors 64 received via the communication network 68. Upon determining that the engine of the vehicle 24 is in the on-state the process 600 moves to a block 645. Upon determining that the engine of the vehicle 24 is not in the on-state, e.g., the engine is in the off-state, the process 600 moves to a block 650.

At the block 645 the computer 30 pivots the steering handles 28 to the extended position. For example, the computer 30 may instruct the second actuator 56 to the retracted position.

At the block 650 the computer 30 pivots the steering handles 28 to the retracted position. For example, the computer 30 may instruct the second actuator 56 to the extended position.

At a block 655 the computer 30 determines whether the vehicle 24 is in the autonomous mode, e.g., based on information from the user interface 66. Upon determining the vehicle 24 is in the autonomous mode, e.g., that the autonomous mode was selected with the user interface 66, the process moves to a block 660. Upon determining the vehicle 24 is not in the autonomous mode, e.g., that the manual mode was selected with the user interface 66, the process moves to a block 665.

At the block 660 the computer 30 pivots the steering handles 28 to the retracted position. For example, the computer 30 may instruct the second actuator 56 to the extended position.

At the block 665 the computer 30 pivots the steering handles 28 to the extended position. For example, the computer 30 may instruct the second actuator 56 to the retracted position.

At a block 670 the computer 30 determines whether a vehicle impact has been detected, e.g., based on information from the sensors 64. Upon determining a vehicle impact has been detected the process 600 moves to a block 675. Upon determining a vehicle impact has not been detected the process 600 may end. Alternately, the process may return to the block 605.

At the block 675 the computer 30 pivots the steering handles 28 to the retracted position. For example, the computer 30 may instruct the first actuator 55 to the extended position. After the block 665 the process 600 may move to a block 680.

At the block 680 the computer 30 inflates the airbag 58. For example, the computer 30 may transmit an instruction to the inflator 60 via the communication network 68. After the block 680 the process 600 may end. Alternately, the process may return to the block 605.

Computing devices, such as the computer 30, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a steering column having a shaft and defining an axis;
a pair of support arms extending radially from the shaft;
a pair of steering handles, each steering handle including an arm extending away from the steering column and a grip supported by the arm, each arm pivotally supported by one of the support arms such that each steering handle is pivotable from an extended position toward the steering column to a retracted position, each arm including an elongated slot spaced from the support arms;
a ring supported by the steering column and operatively engaged with the slots, the ring movable along the axis such that movement of the ring along the axis causes the steering handles to pivot;
a processor; and
a memory storing instructions executable by the processor to pivot the steering handles to the retracted position upon detecting a triggering event.

2. The assembly of claim 1, wherein the triggering event is a vehicle impact.

3. The assembly of claim 1, wherein the memory stores instructions executable by the processor to pivot the steering handles to the extended position or the retracted position based on a determination of whether a vehicle door is in a closed position or an open position.

4. The assembly of claim 1, wherein the memory stores instructions executable by the processor to pivot the steering handles to the retracted position upon determining a vehicle engine is in an off-state.

5. The assembly of claim 1, wherein the memory stores instructions executable by the processor to pivot the steering handles to the extended position upon determining a vehicle engine is in an on-state.

6. The assembly of claim 1, wherein the memory stores instructions executable by the processor to pivot the steering handles to the retracted position or the extended position based on a determination of whether a vehicle is in an autonomous mode or a manual mode.

7. The assembly of claim 1, wherein the memory stores instructions executable by the processor to inflate an airbag after pivoting the steering handles to the retracted position.

8. The assembly of claim 1, wherein the memory stores instructions executable by the processor to pivot the steering handles to the extended position upon determining a vehicle seat is occupied.

9. The assembly of claim 1, wherein the ring is located between the steering column and the support arms.

10. The assembly of claim 9, wherein the ring and the support arms are supported by the shaft.

11. The assembly of claim 1, further comprising an actuator configured to move the ring along the axis.

12. The assembly of claim 1, further comprising an actuator configured to pivot the steering handles to the retracted position.

13. The assembly of claim 12, further comprising a second actuator configured to pivot the steering handles to the retracted position and to the extended position.

14. An assembly comprising:
a seat;
a pair of steering handles in front of the seat;
a vehicle roof;
an airbag supported on the roof and inflatable to an inflated position between the seat and the steering handles;
a processor; and
a memory storing instructions executable by the processor to actuate an actuator configured to pivot the pair of steering handles from an extended position toward a steering column to a retracted position upon detecting a triggering event and to inflate the airbag after pivoting the steering handles to the retracted position.

15. The assembly of claim 14, wherein the triggering event is a vehicle impact.

16. The assembly of claim 14, wherein the memory stores instructions executable by the processor to actuate a second actuator configured to pivot the steering handles to the extended position or the retracted position based on a determination of whether a vehicle door is in an open position or a closed position.

17. The assembly of claim 14, wherein the memory stores instructions executable by the processor to actuate a second actuator configured to pivot the steering handles to the extended position or the retracted position based on a determination of whether a vehicle seat is occupied or unoccupied.

* * * * *